US012809559B2

(12) United States Patent
Okuno

(10) Patent No.: US 12,809,559 B2
(45) Date of Patent: Nov. 24, 2026

(54) COMMUNICATION DEVICE, AND NON-TRANSITORY COMPUTER-READABLE RECORDING MEDIUM FOR COMMUNICATION DEVICE

(71) Applicant: BROTHER KOGYO KABUSHIKI KAISHA, Nagoya (JP)

(72) Inventor: Tetsuya Okuno, Nagoya (JP)

(73) Assignee: BROTHER KOGYO KABUSHIKI KAISHA, Nagoya (JP)

( * ) Notice: Subject to any disclaimer, the term of this patent is extended or adjusted under 35 U.S.C. 154(b) by 115 days.

(21) Appl. No.: 18/930,720

(22) Filed: Oct. 29, 2024

(65) Prior Publication Data

US 2025/0138758 A1 May 1, 2025

(30) Foreign Application Priority Data

Oct. 30, 2023 (JP) ................................ 2023-185503

(51) Int. Cl.
*G06F 3/12* (2006.01)

(52) U.S. Cl.
CPC .......... *G06F 3/1205* (2013.01); *G06F 3/1253* (2013.01); *G06F 3/129* (2013.01)

(58) Field of Classification Search
None
See application file for complete search history.

(56) References Cited

U.S. PATENT DOCUMENTS 6,085,237 A * 7/2000 Durham ................ H04L 41/046 709/221
2004/0230692 A1* 11/2004 Tachiyama ............. H04L 67/02 358/1.15
2007/0162528 A1* 7/2007 Wright ................ G06F 12/0253
2019/0361640 A1 11/2019 Miyake
2025/0142012 A1* 5/2025 Okuno ............... H04N 1/32379

FOREIGN PATENT DOCUMENTS

JP 2004-264995 A 9/2004
JP 2019-207481 A 12/2019

* cited by examiner

*Primary Examiner* — Dov Popovici
(74) *Attorney, Agent, or Firm* — Merchant & Gould P.C.

(57) ABSTRACT

A communication device includes a communication interface, a memory, and a management information base, and a controller. The controller receives a command including an object identifier to request writing a setting value of the object identifier, determines whether the object identifier is a first or second object identifier, sets a setting value according to the received command by writing the setting value when the object identifier is the first object identifier, specifies a memory address indicated by the second object identifier when the object identifier is the second object identifier, and sets a setting value according to the command by writing the setting value to the specified memory address.

6 Claims, 6 Drawing Sheets

COMMUNICATION DEVICE, AND NON-TRANSITORY COMPUTER-READABLE RECORDING MEDIUM FOR COMMUNICATION DEVICE

REFERENCE TO RELATED APPLICATIONS

This application claims priority under 35 U.S.C. § 119 from Japanese Patent Application No. 2023-185503 filed on Oct. 30, 2023. The entire subject matter of the application is incorporated herein by reference.

BACKGROUND ART

The present disclosure relates to a communication device configured to perform writing of the same, and a non-transitory computer-readable recording medium for such a communication device.

Conventionally, there has been known a communication system in which setting values of a communication device in response to a setting request from a server to change the setting values of the communication device via a network.

SUMMARY

Generally, in such a conventional communication system as mentioned above, improvement of security when remotely changing the setting values of the communication device has not been considered in general.

According to an aspect of the present disclosure, a communication device includes a communication interface, a memory configured to store a setting item, a setting value of the setting item, and a management information base, and a controller. The controller is configured to receive a command including an object identifier of the management information base through the communication interface, the command being to request writing of the setting value of the object identifier in the memory, determine whether the object identifier included in the command is a first object identifier or a second object identifier different from the first object identifier, perform a first setting process of setting a setting value according to the received command by writing the setting value corresponding to a value indicated by the command to a memory address indicated by the first object identifier when determining that the object identifier included in the command is the first object identifier, specify a memory address indicated by the second object identifier when determining that the object identifier included in the command is the second object identifier, and perform a second setting process of setting a setting value according to the command by writing the setting value corresponding to a value indicated by the command to the specified memory address.

A non-transitory computer-readable recording medium contains a communication processing program including computer-executable instructions that are executable by a controller of a communication device. The communication device includes a communication interface and a memory. The instructions is configured to, when executed by the controller, cause the communication device to receive a command including a setting item, a setting value of the setting item, and an object identifier of a management information base through the communication interface, the command being to request reading of the setting value of the object identifier from the memory or writing of the setting value of the object identifier in the memory, determine whether the object identifier included in the command is a first object identifier or a second object identifier different from the first object identifier, set a setting value according to the received command by writing the setting value corresponding to a value indicated by the command when determining that the object identifier included in the command is the first object identifier, specify a memory address indicated by the second object identifier when determining that the object identifier included in the command is the second object identifier, and set a setting value according to the command by writing corresponding to a value indicated by the command to the specified memory address.

DESCRIPTION

Hereinafter, an embodiment according to aspects of the present disclosure will be described with reference to the accompanying drawings.

General Overview of Education Service Providing System

Figure 1:
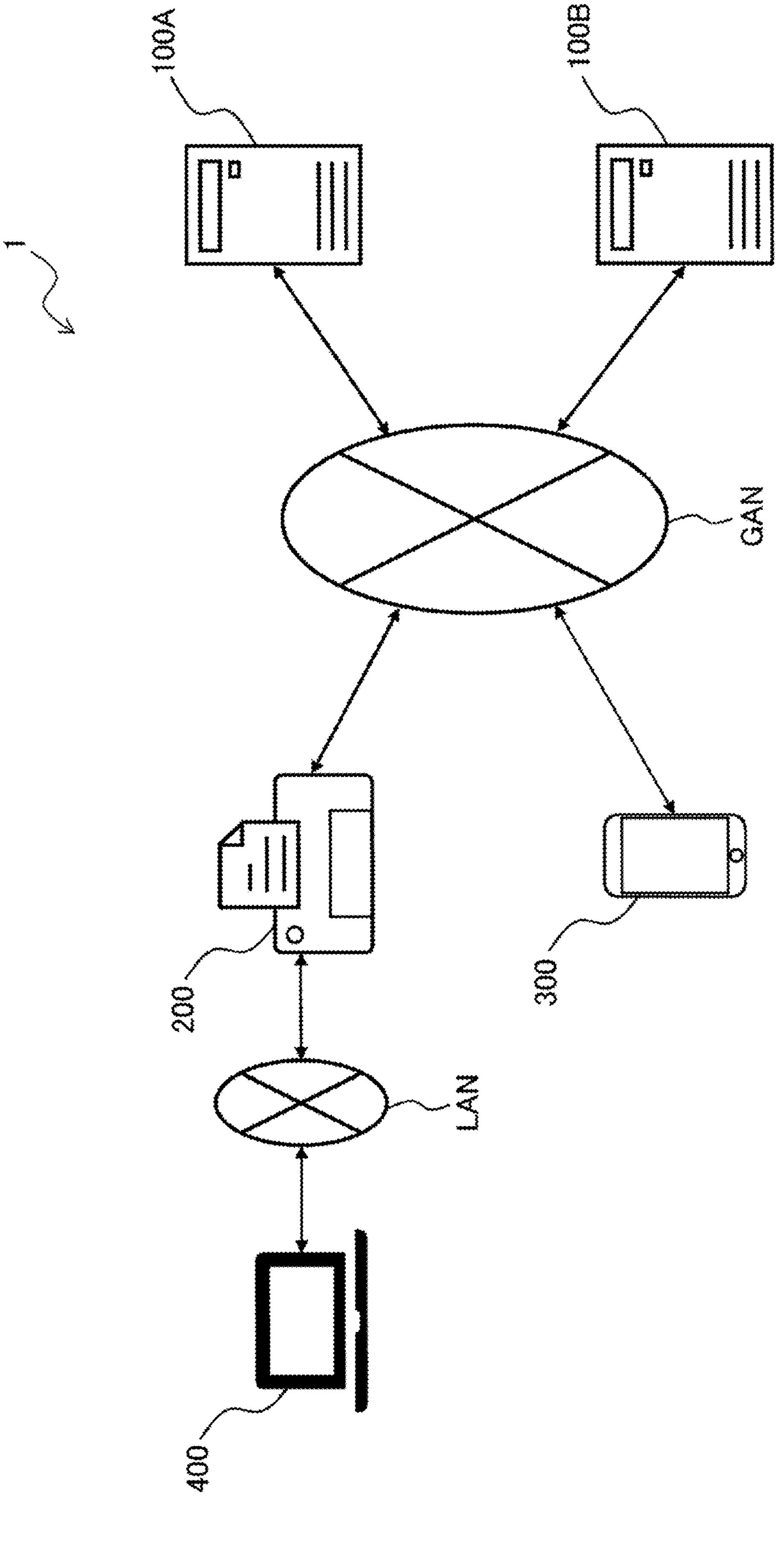
FIG. 1 shows a system configuration of an education service providing system according to the present disclosure.

FIG. 1 shows a block diagram of an education service providing system 1, which is an example of a communication system according to an aspect of the present disclosure. The education service providing system 1 is configured to provide an education service to students at home remotely. The education service providing system 1 according to the present embodiment includes, as shown in FIG. 1, a management server 100A, a service server 100B, a multi-function peripheral (MFP) 200 located at a student's home, a mobile terminal 300, and a user PC 400. The service server 100B is configured to cause the MFP 200 to print out a homework assignment on a sheet. Then, the student operates the MFP 200 to scan the homework assignment sheet on which the student has written answers and electronically transmit the scan data to the service server 100B. Then, teachers on the service server 100B score the student's answers.

In the present embodiment, a case in which the management server 100A is configured to perform various setting processes for the MFP 200 through remote operation via a network will be described.

The management server 100A, the service server 100B, the MFP 200, and the mobile terminal 300 are connected to each other via a wide area network, such as a global area network GAN, so as to transmit and receive data to/from each other. Further, the MFP 200 and the user PC 400 are connected to each other via a premises network LAN, such as a Local Area Network, located on the premises of the home mentioned above, so as to transmit and receive data to/from each other. The global area network GAN includes, for example, the Internet and cellular phone communication lines. It should be noted that the MFP 200, the mobile terminal 300, and the user PC 400, which operate in close proximity on the same premises, may transmit and receive data directly via wired or wireless communications, such as Wi-Fi (registered trademark of Wi-Fi Alliance) or Bluetooth (registered trademark of Bluetooth SIG, Inc.). It is noted the MFP 200 may be an example of a communication device according to an aspect of the present disclosure.

Server

Figure 2:
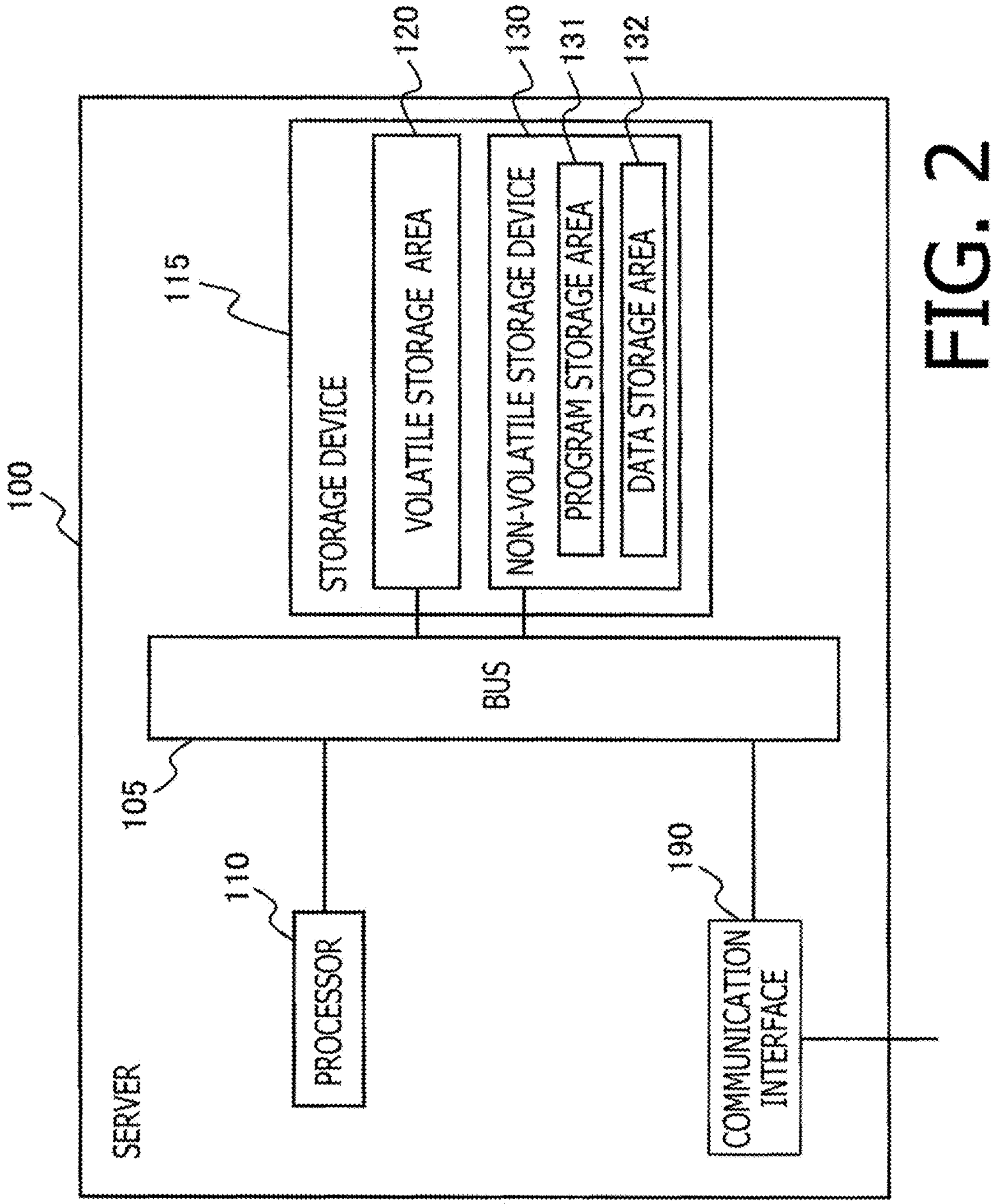
FIG. 2 is a block diagram showing a configuration of a server of the education service providing system.

Both the management server 100A and the service server 100B have almost the same configuration as a server (hereinafter, collectively referred to as a server 100) with communication functions to transmit and receive data and data processing functions to process data. The common configurations between the management server 100A and the service server 100B are shown as a configuration of the server 100 in FIG. 2. As shown in FIG. 2, the server 100 (i.e., each of the management server 100A and the service server 100B) has a processor 110, a storage device 115, and a communication interface 190, which are connected to each other via a bus 105 so that data is transmitted/received therebetween.

The storage device 115 has a volatile storage device 120 and a non-volatile storage device 130. The volatile storage device 120, such as a DRAM, stores various programs and data to be processed. The non-volatile storage device 130 may be an example of a non-transitory computer-readable recording medium according to an aspect of the present disclosure. The non-volatile storage device 130, such as a hard disk drive or solid state drive, has a program storage area 131 and a data storage area 132. Various programs for managing the MFP 200 and for providing the remote education services are stored in the program storage area 131. Various data generated during the execution of the above programs are stored in the data storage area 132.

The processor 110 is a data processing device, such as a CPU, which executes various programs stored in the program storage area 131. The processor 110 performs various processes, including data communication with the MFP 200 and the mobile terminal 300.

The communication interface 190 is a network interface for connecting to the above global area network GAN to transmit and receive data. The communication interface 190 includes hardware components for connecting to the network, such as a network interface card (NIC).

The above storage device 115 is not necessarily limited to the configuration described above. Examples of the storage device 115 include a RAM, a ROM, an EEPROM, an HDD, a portable recording medium such as a USB memory attached to or detached from the server 100, a buffer provided to the processor 110, or any combination of the above.

The storage device 115 may be a computer-readable storage medium. The computer-readable storage medium is a non-transitory medium. The non-transitory medium includes, in addition to the above examples, recording media such as a CD-ROM, and a DVD-ROM. Further, the non-transitory medium is also a tangible medium. The same applies to a storage device 215 of the MFP 200 described below.

MFP

Figure 3:
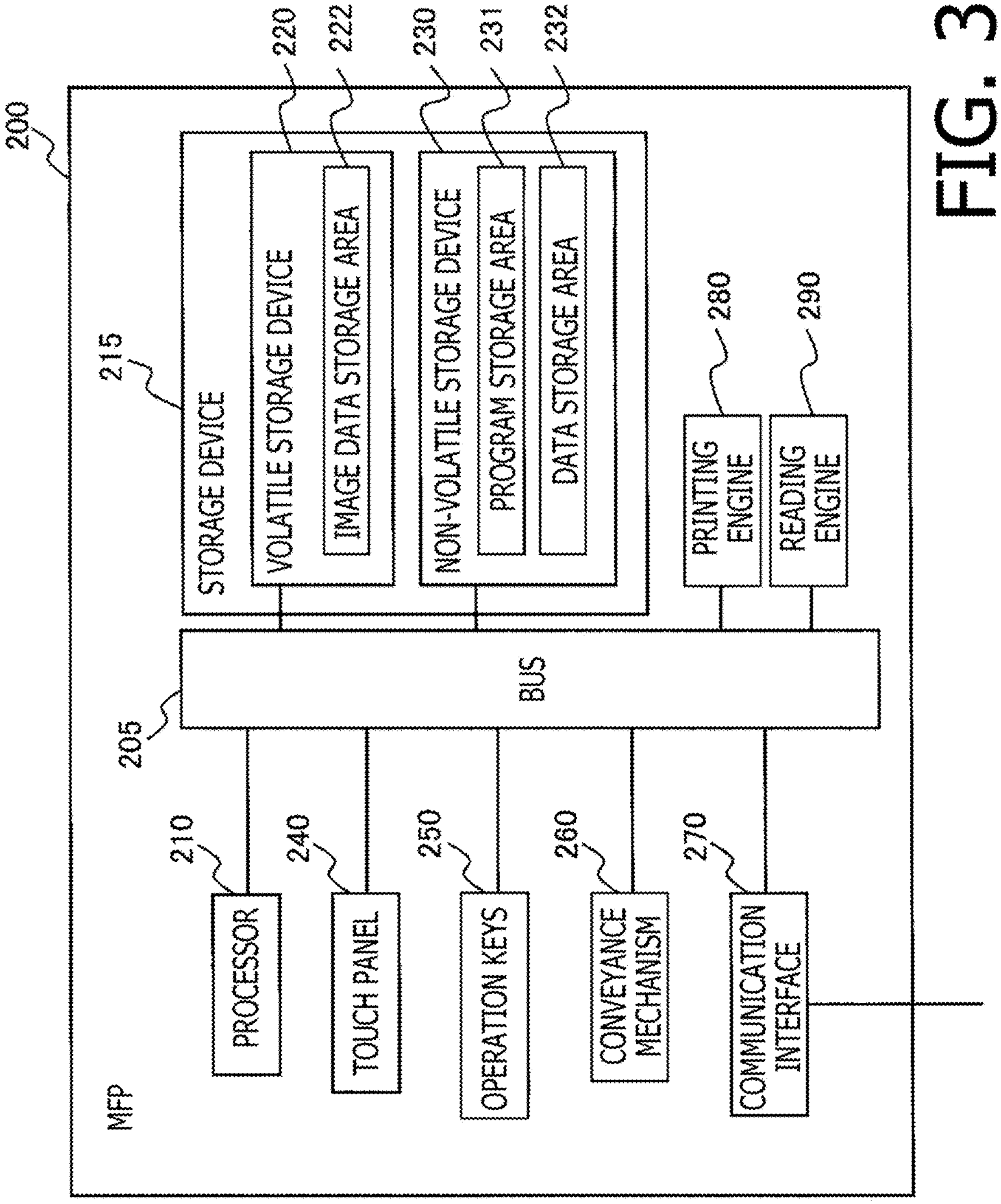
FIG. 3 is a block diagram showing a configuration of a multi-function peripheral (MFP) of the education service providing system.

As shown in FIG. 3, the MFP 200 has a processor 210, the storage device 215, a touch panel 240, operation keys 250, a conveyance mechanism 260, a communication interface 270, a printing engine 280, and a reading engine 290. As shown in FIG. 3, the MFP 200 has a processor 210, a storage device 215, a touch panel 240, operation keys 250, a conveyance mechanism 260, a communication interface 270, a printing engine 280, and a reading engine 290. These components are connected to each other via a bus 205 so that data is transmitted/received therebetween.

The storage device 215 includes a volatile storage device 220 and a non-volatile storage device 230. The volatile storage device 220 has an image data storage area 222 for storing image data to be printed. The volatile storage device 220 may be, for example, a DRAM. The non-volatile storage device 230 has a program storage area 231 and a data storage area 232. The non-volatile storage device 230 may be, for example, an NVRAM provided with a separate power supply (e.g., a battery) dedicated thereto, a flash memory, and the like. Various programs are stored in the program storage area 231. The various programs include firmware, such as a print processing program, and a remote processing program for realizing remote operations on various setting values as shown in a sequence chart in FIG. 6, which will be described later. In the data storage area 232, data for various settings that are set by the above remote processing program is stored.

The processor 210 is a device that performs data processing. The processor 210 may be, for example, a CPU. The processor 210 executes various programs stored in the program storage area 231. The MFP 200 may further include an Application Specific Integrated Circuit (ASIC), and the ASIC, together with the processor 210, may perform data processing for the MFP 200.

The touch panel 240 is configured to display various types of information and accept user operations at coordinates on its display screen. The touch panel 240 is a device that integrally combines, for example, a liquid crystal display and a transmissive touchpad provided thereon. The operation keys 250 are devices that mechanically receive depressions by the user. The communication interface 270 is a network interface used to connect to the above global area network GAN and the premises network LAN to transmit or receive data. The communication interface 270 includes hardware components, such as a Network Interface Card (NIC).

The conveyance mechanism 260 is configured to convey a sheet supplied from a feed tray on which a plurality of sheets are stacked. The printing engine 280 is provided on the sheet conveyance path along which the sheet is conveyed by the conveyance mechanism 260. The printing engine 280 forms an image corresponding to the print job on the sheet conveyed by the conveyance mechanism 260 using a particular image forming method. The reading engine 290 is provided below a platen or on the document conveyance path along which a document is conveyed by a document conveyance device. The reading engine 290 optically reads a document placed on the platen or conveyed by the document conveyance device to obtain image data representing the read image. It is noted that the processor 210 may be an example of a controller or a computer according to an aspect of the present disclosure. Further, the storage device 215 may be an example of a memory according to an aspect of the present disclosure.

Mobile Terminal

The mobile terminal 300 includes a portable terminal such as a smartphone equipped with functions for displaying image data, inputting user operations, communicating to transmit and receive data, and processing data. A common configuration among configurations for realizing the above functions is shown in FIG. 4.

Figure 4:
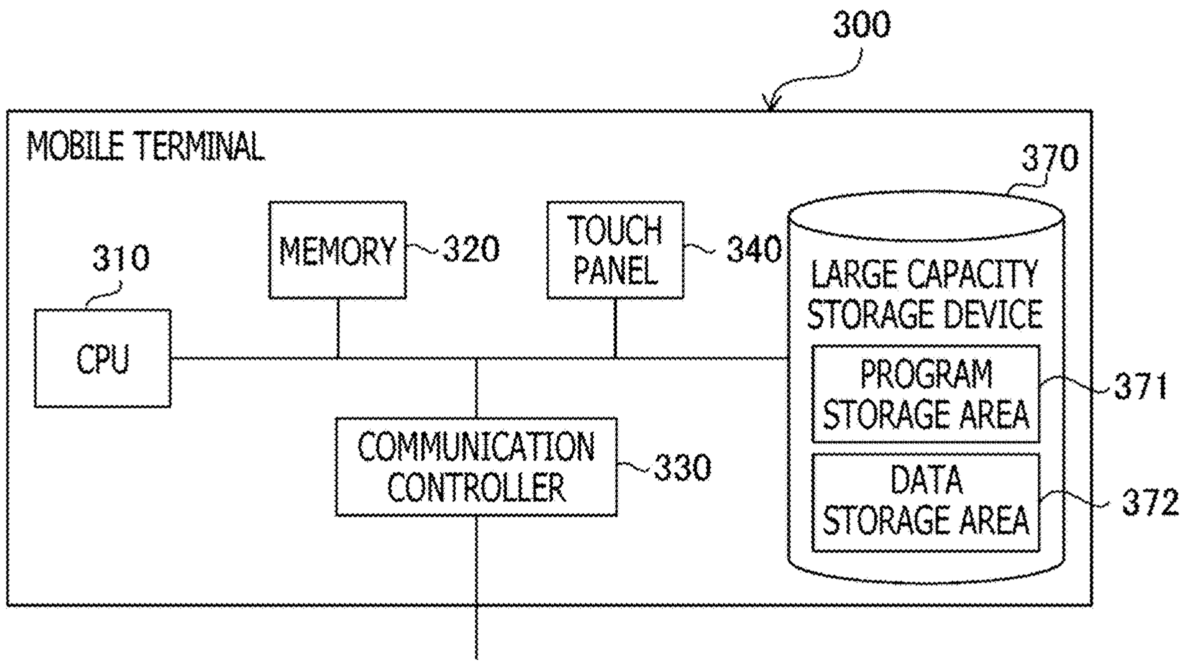
FIG. 4 is a block diagram showing a configuration of a mobile terminal of the education service providing system.

As shown in FIG. 4, the mobile terminal 300 has a CPU 310, a memory 320, a communication controller 330, a touch panel 340, and a large capacity storage device 370.

The large capacity storage device 370 has a program storage area 371 and a data storage area 372. The large capacity storage device 370 may be, for example, a flash memory. In the program storage area 371, various programs are stored. The CPU 310 is configured to execute each of the various programs stored in the program storage area 371. The CPU 310 executes various processes including data communication with the service server 100B or the MFP 200 via the communication controller 330 or via wireless communication such as cellular networks or wireless LAN.

The mobile terminal 300 is configured to display various data and accept various user operations via the touch panel 340, which integrally combines an LCD display and a transmissive touchpad provided thereon. The user can input various instructions into the mobile terminal 300 by operating the touch panel 340.

Alternatively, the mobile terminal 300 may be replaced with another information terminal, such as a general-purpose personal computer or a tablet computer.

User PC

The user PC 400 is a well-known general-purpose personal computer with a CPU, memory, display, and a communication interface for connecting the PC 400 to the premises network LAN.

Remote Education Service and Remote Operation of Setting Values of MFP

Figure 5:
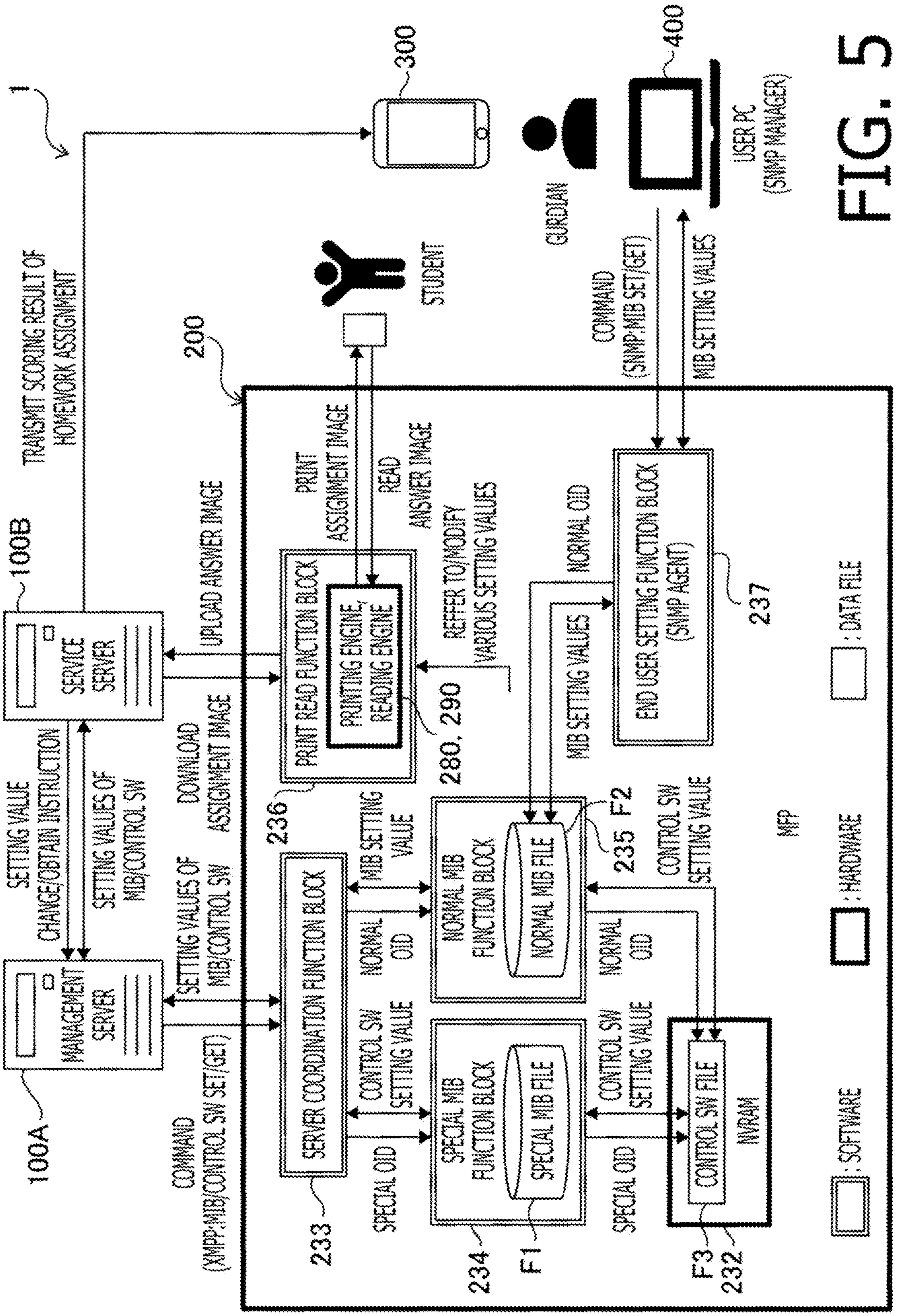
FIG. 5 is a block diagram showing functional blocks realized in the MPF and data flow in the education service providing system.

The remote education service provided by the education service providing system 1 according to the present embodiment will be described with reference to FIG. 5, as well as a flow of various data related to the remote education service. In this remote education providing system 1 shown in FIG. 5, a student participating in the remote education service receives a sheet with homework assignments printed thereon and sends their answers from home to be scored by teachers.

For this purpose, in the present embodiment of the education service providing system 1, the service server 100B, which is owned and operated by a management company of the remote education service, transmits the image data of the homework assignment to the MFP 200 at the student's home. The MFP 200 controls the printing engine 280 to print the image data of the homework assignment received from the service server 100B on a sheet. The MFP 200 causes its reading engine 290 to scan the sheet on which the student has written their answers to the homework assignment. This generates image data of the scanned sheet. The MFP 200 uploads the image data to the service server 100B. When teachers at the above management company score the homework assignment based on the uploaded image data, and input the scoring results into the service server 100B, the service server 100B transmits the input scoring results to the mobile terminal 300 owned by a parent or guardian of the student.

In the use and operation of the above-mentioned remote education service, the above-mentioned management company and/or each of the parents/guardians may wish to arbitrarily set various settings for the MFP 200. One specific example of such set values is a set value for a button assignment function that assigns one of a limited number of operation keys 250 provided on a low-spec model MFP 200 to a scan button for entering an instruction to start reading (scanning). Another example is a set value for enabling or disabling a memory stop function to automatically stop a reading process by the reading engine 290 when the image data of a sheet read by the reading engine 290 exceeds the memory capacity of the MFP 200.

The setting value for the button assignment function (i.e., the function to start reading) is unique to each model of the MFP 200 because the setting value is to be associated with data such as a key ID of the operation key 250 whose specifications differ depending on the model of the MFP 200. In contrast, the setting value for enabling and disabling the memory stop function does not need to be associated with data that has different specifications for different models of the MFP 200. The setting value for enabling and disabling the memory stop function is common among multiple models of the MFP 200 because it only represents enablement and disablement.

As described above, there are various and numerous setting values for the MFP 200, some of which are specific to the specification of the model, while others are common to multiple models. It would be very complicated for the user to manually set all these setting values. Therefore, it is necessary for the management server 100A to have an ability to remotely obtain or change the setting values in the MFP 200 via network communication. Further, it is desirable to reduce development and manufacturing costs for the MFP 200 product itself as much as possible, while saving as much storage capacity as possible in the memory that stores the various setting values.

Furthermore, depending on the type of setting values, some should not be allowed to be obtained or changed by outsiders, even by the management company or end users (guardians), and their existence should be kept secret as much as possible. Therefore, there is a need for a configuration that can improve security while allowing remote obtaining and changing of the setting values of the MFP 200 using a public global area network GAN. The above-mentioned changing of the setting values may be an example of writing of setting values, and the above-mentioned obtaining of setting values may be an example of reading of setting values according to an aspect of the present disclosure.

Management of Setting Values Using MIB

In the education service providing system 1 according to the present embodiment, among all the setting values set to the MFP 200, setting values for remotely managing network communication devices are managed by using a so-called Management Information Base (MIB), which has already been in widespread use as a standard. In the present embodiment, a control SW (SWitch) refers to an example of a group of setting values of the MFP 200.

The MIB is known as a database file that describes various setting values and status data in a tree-structured text. Concretely, the MIB contains identification data called OIDs (Object IDs), each representing a setting value or status data of the MFP200 (Value). Generally, the MIB is monitored via the Simple Network Management Protocol (SNMP), which is a protocol for network management, by software coordination of both an SNMP manager on the managing side and an SNMP agent on the managed side.

For example, a command to write "1" to a memory address of a setting value identified by the OID "1.2.3.4.5.6.7.8" is described as "SET OID=1.2.3.4.5.6.7.8 Value=1". Further, a command to obtain the value of the memory address of the setting value for the same OID is described as "GetRequest OID=1.2.3.4.5.6.7.8". Further, as the MIB standard, two types of MIBs are applicable: a standard MIB, which is defined in advance for setting data common to all device manufacturers, and an extended MIB, which allows respective device manufacturers to define their own setting data.

On the other hand, the control SW is an example of setting data (i.e., setting values) that can be changed by the end user (the guardian in this example). The control SW is a file with a data format that is described in a unit of particular number of bits within particular binary data.

A command to set the first bit of the binary data stored at a memory address of which identification number is 10 (i.e., the 10th memory address), where the setting value of the control SW is stored, to "1" is written as "SW No. 10 Bit 1:1". This control SW is only defined in advance by the device manufacturer as a description format for setting data. In the communication device, the setting data is changed and obtained according to the format by an application originally developed by the device manufacturer.

By using the control SW, a large number of setting values can be managed with a small memory capacity, as the required file data volume of the control SW is small. In contrast, if all control SWs are remotely managed using the MIB, a large memory capacity is required in the MFP 200 due to the large file data volume required for the MIB, which increases development and manufacturing costs. Therefore, by using the control SW to manage part of the setting values, the software configuration required for the remote operation of setting data in the MFP 200 can be efficiently developed, and development and production costs can be greatly reduced.

In the present embodiment, the MFP 100 remotely manages the control SW, which is the setting data specific to the device manufacturer, using two types of extended MIBs that include the OIDs defined by the device manufacturer. A first extended MIB uses a command "SET OID=1.2.3.4.5.6.7.8 Value=1" as described above. In this MIB, by "OID=1.2.3.4.5.6.7.8", the identification number of the control SW "SW No. 10" is indicated, and by "Value=1", a setting value corresponding to the above identification number is indicated. This MIB will be referred to as a normal MIB. The normal MIB does not have a complete one-to-one correspondence with the setting values of the control SW, but is an MIB with highly abstract content as if it collects multiple setting values of the control SW. The second extended MIB is an MIB that has a complete one-to-one correspondence to the setting value of the control SW of the MFP 200, which is hereafter referred to as a special MIB.

In the special MIB, for example, a character string "1.2.3.4.5.6.7.9" indicating that it is a special OID, a memory address where the setting value of the identification number "No. 10" of the control SW is stored, and the value to be set to that memory address are combined and written as "OID=1.2.3.4.5.6.7.9<SW No. 10 memory address>Value=1". The special OID in the form of "OID=1.2.3.4.5.6.7.9<Memory address of SW No. 10>Value=1" is defined originally and used.

As described above, in the present embodiment, the MFP 200 has an interface layer of the normal MIB and the special MIB to allow the management server 100A to remotely obtain and change the setting data of the control SW. It should be noted that the above OID may be an example of an object identifier, and the special OID may be an example of a first object identifier, and the normal OID may be an example of a second object identifier according to an aspect of the present disclosure.

System Configuration and Data Flow

A software block configuration that executes processing in the MFP 200 and data flow for realizing the remote control of the setting values described above will be described with reference to FIG. 5. In FIG. 5, the MFP 200 has following software blocks that can be executed by the processor 210 of the MFP 200: a server coordination function block 233, a special MIB function block 234, a normal MIB function block 235, a print/read function block 236, and an end user setting function block 237. The special MIB function block 234 has a data file F1 for the special MIB, and the normal MIB function block 235 has a data file F2 for the normal MIB. Further, a data file F3 of the control SW is recorded in the data storage area 232 of the non-volatile storage device 230 (an example configured by "NVRAM" is shown in FIG. 5).

The server coordination function block 233 accesses either the special MIB function block 234, or the normal MIB function block 235, depending on the command received from the management server 100A. The server coordination function block 233 determines whether the OID specified in the received command is the normal OID or the special OID by matching a text string in the specified OID with text strings of the respective OIDs. For this matching, concretely, the server coordination function block 233 refers to the normal MIB file F2 that contains all the normal OIDs as a list and the special MIB file F1 that contains all the special OIDs as a list, and determines the OID that matches the OID specified in the received command. In addition, the OID may be determined to be the special OID if the OID contains the particular value "1.2.3.4.5.6.7.9", which indicates that the OID is the special OID.

If the determination result indicates the special OID, the server coordination function block 233 passes the command to the special MIB function block 234. On the other hand, if the determination result indicates the normal OID, the server coordination function block 233 passes the command to the normal MIB function block 235. Further, the server coordination function block 233 returns the setting values to the management server 100A when the server coordination function block 233 obtains the setting values from the special MIB function block 234 or the normal MIB function block 235.

The special MIB function block 234 accesses the control SW file F3 stored in the NVRAM 232 based on the special OID contained in the command passed from the server coordination function block 233 mentioned above, and changes or obtains the setting values. If the command instructs a change of the setting value, the special MIB function section 234 changes the value stored at the memory address, which is indicated by the special OID, where the setting value of the control SW is stored, to the value specified by the command. If the command instructs an obtainment of the setting value, the special MIB function block 234 obtains the setting value stored at the memory address, which is indicated by the special OID, and returns the setting value to the server coordination function block 233.

The normal MIB function block 235 accesses the control SW file F3 stored in the NVRAM 232 based on the normal OID contained in the command passed from the above server coordination function block 233 to change or obtain the setting values. Concretely, first, the normal MIB function block 235 refers to the correspondence relationship between the normal OID and the memory address stored in the NVRAM 232 in advance, and identifies the memory address where the control SW setting value corresponding to the text string of the normal OID is stored. If the command instructs a change of the setting value, the normal MIB function section 235 changes the value stored at the identified memory address to the value specified in the command. If the command instructs an obtainment of the setting value, the normal MIB function block 235 obtains the setting value stored at the identified memory address and returns the setting value to the server coordination function block 233.

The end user setting function block 237 is a software processing block that functions as the SNMP agent described above. The end user setting function block 237 passes the command transmitted from the SNMP manager on the user PC 400 used by the guardian to the normal MIB function block 235 described above, and the normal MIB function block 235 changes or obtains the setting values. If the command instructs a change of the setting value, the normal MIB function section 235 changes the value stored at the identified memory address to the value specified in the command. If the command instructs an obtainment of the setting value, the normal MIB function block 235 obtains the setting value stored at the identified memory address and returns the setting value to the end user setting function block 237. The end user setting function block 237 then returns the setting value to the user PC 400 when the setting values are obtained from the normal MIB function block 235.

The print/read function block 236 downloads the image data of the homework assignment from the service server 100B and controls the printing engine 280 to print the image data of the homework assignment on a sheet. Further, the print/read function block 236 controls the reading engine 290 to read a sheet with the answers to the homework assignment and upload the read image data. At this time, the print/read function block 236 accesses the control SW file F3 to reference or change the setting data related to the execution of various control processes. For these accesses, well-known access methods and software to the control SW can be used.

Security Measures

As described above, the special OIDs and corresponding types of setting data are specifically defined by the device manufacturer, and are basically confidential data that should not be known to anyone outside the company, including service operators and end users. Therefore, the existence of special OIDs, their contents, and the types and contents of the corresponding setting data should be kept confidential and not disclosed by the device manufacturer for security reasons.

The MIB monitoring by the SNMP agent in conjunction with the SNMP manager via the SNMP protocol as described above does not pose any security issue even when the communication is performed via the SNMP protocol when data is transmitted to and/or received from the MFP 200 via a private premises network LAN as in the case of the PC 400 described above. On the other hand, when the management server 100A or the service server 100B transmits and receives data to and from the MFP 200 over the public global area network GAN, it is desirable to use a protocol with higher security strength than the SNMP protocol for communication.

The server coordination function block 233 in the MFP 200 in the present embodiment determines whether the management server 100A is a transmission source of the command containing the OID determined to be the special OID by the above-mentioned method. Specifically, when the server coordination function block 233 receives a command containing an OID determined to be the special OID via a communication protocol, such as XMPP (see FIG. 5) that can identify the individual device with which it communicates, the server coordination function block 233 determines that the transmission source of that command is the management server 100A. In addition to XMPP in the example shown in FIG. 5, any communication protocol that can identify the individual devices with which it is communicating, such as MQTT, can be applied in a similar manner. If the transmitted or received command includes a service ID identifying the individual device from which the command is transmitted, the transmission source of the command may be identified based on the service ID.

If the server coordination function block 233 determines that the special OID is received from an external device unrelated to the management server 100A, the server coordination function block 233 notifies the external device, which is the transmission source of the OID, that the received OID does not actually exist, and does not process the setting data according to the command including the special OID. In this way, even if a command including the special OID is happened to be received from an unrelated external device mentioned above, the existence of the special OID applied in the MFP 200 or the contents of the special OID will not be identified, thereby improving security. The XMPP and MQTT communication protocols above may be examples of a first protocol, and SNMP above may be an example of a second protocol according to an aspect of the present disclosure.

Control Procedure

Figure 6:
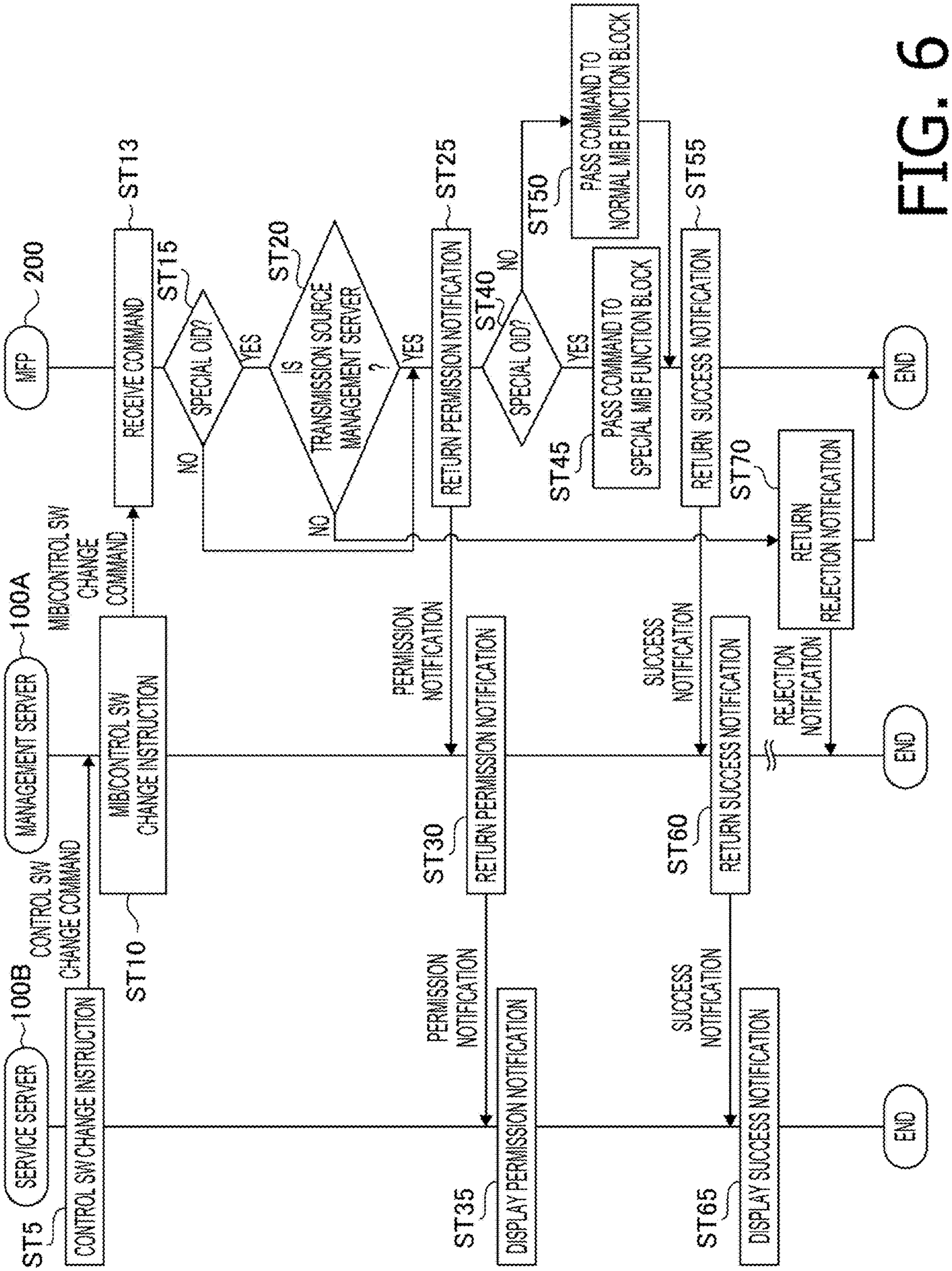
FIG. 6 is a sequence chart showing procedures when a service server transmits an instruction to change setting values of the MFP via a management server.

An example of control procedures to be performed by the processor 110 of the service server 100B, the processor 110 of the management server 100A, and the processor 210 of the MFP 200 in order to achieve the remote control over the above setting values in the present embodiment is described with reference to a sequence chart shown in FIG. 6. FIG. 6 shows a sequence when the service server 100B transmits an instruction to the management server 100A to perform a change operation for particular setting values of the control SW in the MFP 200. The procedures performed by the MFP 200 in this sequence chart are mainly performed by the server coordination function block 233 described above.

Hereinafter, a term "step" in front of step numbers such as "ST5" will be omitted when indicating the step numbers in the sequence.

First, in step ST5, the service server 100B instructs the management server 100A to change the setting value of the particular control SW in the MFP 200 to particular setting value. At this time, the service server 100B transmits, to the management server 100A, a control SW change command that includes the special OID indicating the identification number of the control SW, the bit No. used to identify the location of the specific bit in the memory address that stores the setting value of the control SW, and a value subject to be changed. In ST10, the management server 100A transmits a MIB/control SW change command including the special OID generated based on the received control SW change command to the MFP 200.

The MFP 200 receives the MIB/control SW change command in ST13 and determines in ST15 whether the OID contained in the received MIB/control SW change command is the special OID, in other words, whether the OID contained in the received MIB/control SW change command is other than the normal OID or not. When it is determined that the OID is the special OID (ST15: YES), the process proceeds to ST20. In ST20, the MFP 200 determines whether the transmission source of the MIB/Control SW command is the management server 100A or not based on the communication protocol of the received command. If the transmission source is the management server 100A (ST20: YES), the process proceeds to ST25.

In ST25, the MFP 200 returns a permission notification to the management server 100A indicating that the change operation requested by the received MIB/control SW change command is permitted. Upon receiving the permission notification, the management server 100A returns the permission notification to the service server 100B, which is a transmission source of the corresponding MIB/control SW change command, in ST30. Upon receiving the notification, the service server 100B displays the permission notification received from the management server 100A on a display or the like in ST35 to report that the MIB/control SW change command has been accepted.

Next, in ST40, the MFP 200 determines whether the OID contained in the received MIB/control SW change command is the special OID or not, as in ST15. If the OID is the special OID (ST40: YES), the command is passed to the above special MIB function block 234 in ST45 to change the control SW setting value identified by the special OID included in the command to the setting value that is included in the command.

On the other hand, if the OID contained in the received command is the normal OID (ST15: NO), the process proceeds to ST25. If the OID contained in the received MIB/control SW change command is the normal OID (ST40: NO), the process proceeds to ST50. In ST50, the MFP 200 passes the command to the above-mentioned normal MIB function block 235 to change the control SW setting value specified by the normal OID included in the command to the setting value included in the command.

After ST45 and ST50, when the MFP 200 receives a notification from the special MIB function block 234 or the normal MIB function block 235 that the change of the control SW setting value has succeeded, the MFP 200 returns, in ST55, a success notification indicating that the change operation requested by the received MIB/control SW change command has succeeded. Upon receiving the success notification, the management server 100A returns the success notification to the service server 100B, which is the transmission source of the MIB/control SW change command, in ST60. Upon receiving the success notification, the service server 100B notifies the success of the change operation of the MIB/control SW change command by displaying the success notification received from the management server 100A on the display in ST65.

On the other hand, if the transmission source of the received command is not the management server 100A (ST20: NO), the process proceeds to ST70. In ST70, the MFP 200 returns a rejection notification to the transmission source, which is not specifically shown in FIG. 6, to the effect that the change operation requested by the received MIB/control SW change command was rejected. In such a case, even if the OID specified in the received command is the special OID that is actually specified, the rejection notification notifies the user that the OID which does not exist is included.

The example shown in FIG. 6 shows a case in which a command to change the setting values is transmitted, but a case in which a command to obtain the setting values is transmitted can be handled substantially in the same manner. In other words, in the procedure of ST45 and/or ST50 above, the MFP 200 passes the command to the special MIB function block 234 or the normal MIB function block 235 as above, to obtain the setting value instead of changing the setting values. When the MFP 200 receives the success notification from the special MIB function block 234 or the normal MIB function block 235 after ST45 and ST50 that the obtaining of the control SW setting values has succeeded as well as the obtained setting values, the MFP 200 also returns the obtained setting values when returning the success notification in ST55.

Further, although not specifically shown in FIG. 6, a procedure to determine whether the received command is for changing or obtaining the setting value may be added immediately after ST15. If it is determined that the received command is for requesting a change in the setting values, the process may proceed to ST20, while if it is determined that the received command is for requesting to obtain the setting value, the process may proceed to ST25. Then, in S25, the MFP 200 may perform the obtaining of the setting value requested by the command, regardless of the device that transmitted the received command. Conversely, if it is determined that the received command is a request for obtaining the setting values, the process may proceed to ST20, while if it is determined that the received command is a request for changing the setting values, the process may proceed to ST25. Then, in ST25, the MFP 200 may change the setting value requested by the command regardless of the device that transmitted the received command.

Effects

As described above, in the education service providing system 1 according to the present embodiment, the processor 210 of the MFP 200 receives a command requesting the change or obtainment of the setting values corresponding to the OIDs in the MIB via the global-area network GAN in ST13. Whether the OID included in the command is determined to be the special OID or the normal OID in ST15. Depending on whether the OID included in the command is the special OID or the normal OID, handling of the command is differentiated.

In the special OID, data indicating memory address, at which the setting value is stored, is contained. When the special OID is included in the command, the setting value of the memory address represented by the special OID is directly set to a setting value corresponding to the value written by the command.

On the other hand, data indicating the memory address, at which the setting values stored, is not included in the normal OID. Therefore, when the normal OID is included in the command, the controller specifies the memory address indicated by the normal OID in ST50. The processor 210 sets, in ST50, the setting value stored at the memory address specified above as a setting value corresponding to the value written by the command.

As described above, when changing the setting values of the setting items stored in the memory, if the OID included in the command is the special OID, a method of changing the values of the memory addressed indicated by the special OID in question is to directly change the same. Therefore, the OID cannot be changed by the same method as when the OID in the command is the normal OID, which is to specify the memory address corresponding to the OID and then set the setting values of the specified memory addresses to the setting values corresponding to the written values.

According to the present embodiment, the processor 210 of the MFP 200 does not respond to a remote setting request according to a conventional method for the special OID, thereby inhibiting the MFP 200 from changing its settings, and thus improving its security.

Furthermore, in the present embodiment, for example, a list of specific character strings is stored in advance in the storage device 215, and in ST15, the determination is made based on whether or not the specific character strings are included in the OID included in the command. In this way, the special OID can be reliably identified using the character strings.

In the present embodiment, if the processor 210 of the MFP 200 receives a command from a remote device using a communication protocol other than the specific communication protocol, such as XMPP in the above example, the processor 210 of the MFP 200 will not accept the writing by such a command. In this way, the processor 210 can suppress setting changes by the command using the other communication protocol by limiting the command that accepts writing to those using specific communication protocols, thereby improving security.

In addition, when the OID included in the command is a special OID, this system switches between execution and non-execution of processing based on the communication protocol used in the above-mentioned command. In this way, security can be reliably improved when the OID in the command is a specific object identifier.

In this embodiment, if the OID included in the command is a special OID and the command is received with a communication protocol other than the particular communication protocol, it is notified in the notification process executed by processor 210 that the special OID concerned does not exist. In this way, it is possible to report that the OID in question is invalid.

The sequence chart shown in FIG. 6 does not limit aspects of the present disclosure to those shown therein, but procedures may be added, deleted, or modified to the extent that they do not depart from the intent and technical concept according to aspects of the present disclosure.

While aspects of the present disclosure have been described in conjunction with various example structures outlined above and illustrated in the figures, various alternatives, modifications, variations, improvements, and/or substantial equivalents, whether known or that may be presently unforeseen, may become apparent to those having at least ordinary skill in the art. Accordingly, the example embodiments of the disclosure, as set forth above, are intended to be illustrative of aspects of the present disclosure, and not limiting the same. Various changes may be made without departing from the spirit and scope of the disclosure. Therefore, the disclosure is intended to embrace all known or later developed alternatives, modifications, variations, improvements, and/or substantial equivalents.

What is claimed is:

1. A communication device, comprising:

a communication interface;

a memory configured to store a setting item, a setting value of the setting item, and a management information base; and a controller;

wherein the controller is configured to:

receive a command including an object identifier of the management information base through the communication interface, the command being to request writing of the setting value of the object identifier in the memory;

determine whether the object identifier included in the command is a first object identifier or a second object identifier different from the first object identifier;

perform a first setting process of setting a setting value according to the received command by writing the setting value corresponding to a value indicated by the command to a memory address indicated by the first object identifier when determining that the object identifier included in the command is the first object identifier;

specify a memory address indicated by the second object identifier when determining that the object identifier included in the command is the second object identifier; and perform a second setting process of setting a setting value according to the command by writing the setting value corresponding to a value indicated by the command to the specified memory address.

2. The communication device according to claim 1, wherein the controller is configured to determine that the object identifier is the first object identifier in a case where specific character strings are contained in the object identifier included in the command; and determine that the object identifier is the second object identifier in a case where the specific character strings are not contained in the object identifier included in the command.

3. The communication device according to claim 1, wherein the controller is configured to determine whether the command has been received in a secured first protocol or in a second protocol different from the first protocol, wherein the controller is configured to perform the first setting process or the second setting process according to the command when determining that the command has been received in the first protocol and not to perform the first setting process and the second setting process according to the command when determining that the command has been received in the second protocol.

4. The communication device according to claim 3, wherein the controller is configured to perform the first setting process according to the command in a case where the object identifier included in the command is the first object identifier and when determining that the command has been received in the first protocol, and not to perform the first setting process according to the command in a case where the object identifier included in the command is the first object identifier and when determining that the command has been received in the second protocol.

5. The communication device according to claim 4, wherein the controller is configured to notify that the object identifier does not exist in a case where the object identifier included in the command is the first object identifier and when determining that the command has been received in the second protocol.

6. A non-transitory computer-readable recording medium containing a communication processing program including computer-executable instructions that are executable by a controller of a communication device, the communication device including a communication interface and a memory, the instructions being configured to, when executed by the controller, cause the communication device to:

receive a command including a setting item, a setting value of the setting item, and an object identifier of a management information base through the communication interface, the command being to request reading of the setting value of the object identifier from the memory or writing of the setting value of the object identifier in the memory;

determine whether the object identifier included in the command is a first object identifier or a second object identifier different from the first object identifier;

set a setting value according to the received command by writing the setting value corresponding to a value indicated by the command to a memory address indicated by the first object identifier when determining that the object identifier included in the command is the first object identifier;

specify a memory address indicated by the second object identifier when determining that the object identifier included in the command is the second object identifier; and set a setting value according to the command by writing the setting value corresponding to a value indicated by the command to the specified memory address.

* * * * *